United States Patent
Adamczyk et al.

[19]

[11] Patent Number: 5,974,790
[45] Date of Patent: Nov. 2, 1999

[54] CATALYTIC CONVERTER DECONTAMINATION METHOD

[75] Inventors: Andrew Anthony Adamczyk, Dearborn; Arthur E Kolasa, Northville; James David Pakko, Dearborn, all of Mich.

[73] Assignee: Ford Global Technologies, Inc., Dearborn, Mich.

[21] Appl. No.: 09/035,081

[22] Filed: Mar. 5, 1998

[51] Int. Cl.⁶ .................................................. F01N 3/00
[52] U.S. Cl. ................. 60/274; 60/276; 60/277; 60/285; 60/286; 60/295
[58] Field of Search ............. 60/274, 276, 285, 60/277, 295, 286

[56] References Cited

U.S. PATENT DOCUMENTS

| | | |
|---|---|---|
| 5,357,751 | 10/1994 | Orzel . |
| 5,402,641 | 4/1995 | Katoh et al. . |
| 5,537,816 | 7/1996 | Ridgway et al. . |
| 5,544,481 | 8/1996 | Davey et al. . |
| 5,601,698 | 2/1997 | Innes . |
| 5,655,363 | 8/1997 | Ito et al. ..................................... 60/277 |
| 5,657,625 | 8/1997 | Koga et al. . |
| 5,724,808 | 3/1998 | Ito et al. ..................................... 60/276 |

*Primary Examiner*—Thomas E Denion
*Attorney, Agent, or Firm*—Allan J. Lippa

[57] ABSTRACT

A method for restoring exhaust purifying capability of a sulfur contaminated catalytic converter of an internal combustion engine. Catalytic converter efficiency is measured with a first exhaust gas oxygen sensor positioned upstream of the catalytic converter and a second exhaust gas oxygen sensor positioned downstream of the catalytic converter. When catalytic converter efficiency falls below a desired level, catalytic converter temperature is elevated and the engine is operated to produce a rich exhaust gas mixture to reduce the sulfur contamination. Then, to further reduce the sulfur contamination, the engine is operated to produce a lean exhaust mixture.

17 Claims, 5 Drawing Sheets

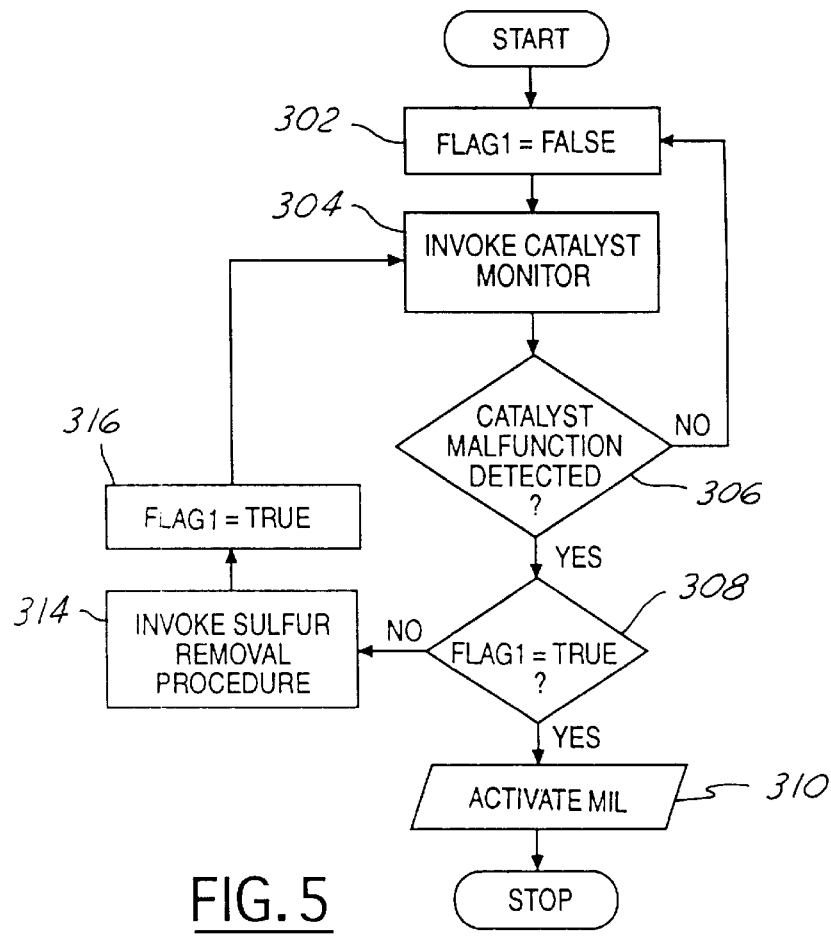
FIG. 5
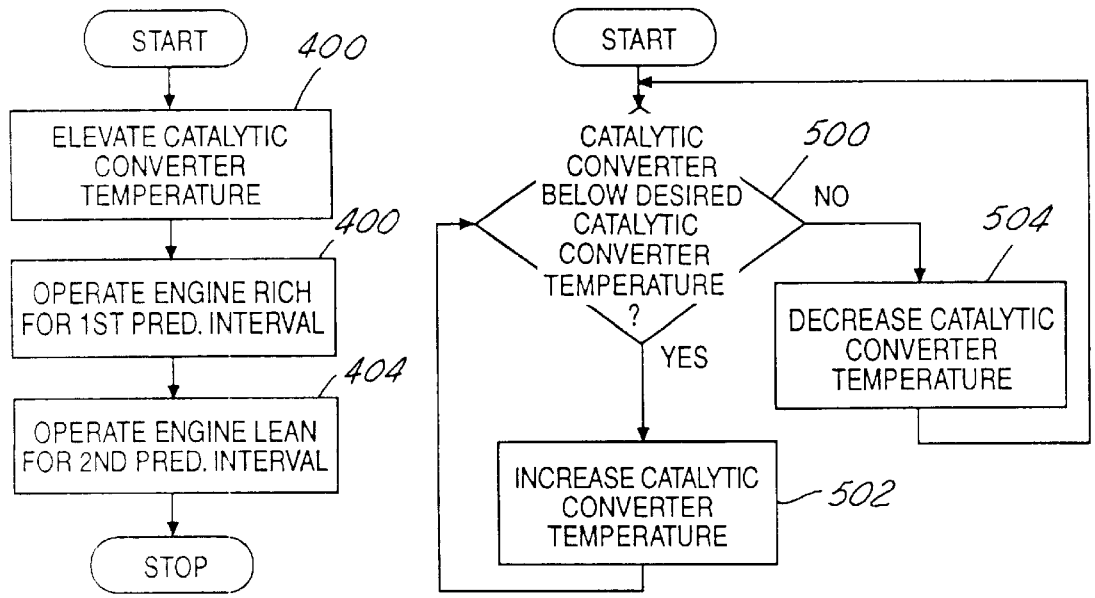
FIG. 6
FIG. 7

CATALYTIC CONVERTER DECONTAMINATION METHOD

FIELD OF THE INVENTION

The present invention relates to a sulfur decontamination method for a three way exhaust catalytic converter of an internal combustion engine.

BACKGROUND OF THE INVENTION

To meet current emission regulations, automotive vehicles must have on-board diagnostic systems to detect the malfunction of any component of the emission system, including a catalytic converter. At the same time, the exhaust system must purify the exhaust gas to reduce the concentration of certain regulated compounds. To meet the increasingly low level of exhaust emissions required, new catalytic converter formulations have been found that are more effective at accomplishing this goal. However, one drawback is that the new catalytic converter formulations are increasingly susceptible to sulfur contamination. While sulfur content in fuel is limited to 80 ppm in some states, fuel in other states can contain as much as 1000 ppm of sulfur.

Catalytic converter monitoring systems are known in which an upstream and a downstream exhaust gas oxygen sensor are compared to give an indication of catalytic degradation. If sulfur contamination occurs, these systems will diagnose the contamination and illuminate a malfunction indicator. As a result, a new catalytic converter will be required. An example of such an approach is disclosed in U.S. Pat. No. 5,357,751.

The inventors herein have recognized numerous problems with the above approaches. For example, because sulfur contamination may not be permanent, a sulfur contaminated catalytic converter would be replaced and discarded when it may be possible to decontaminate the catalytic converter and restore the exhaust purifying capability.

SUMMARY OF THE INVENTION

An object of the invention claimed herein is to provide a method to restore the exhaust purifying capability of a sulfur contaminated catalytic converter.

The above object is achieved, and problems of prior approaches overcome, by a catalytic converter decontamination method for an internal combustion engine. The method comprises the steps of: generating a catalytic converter contamination signal when catalytic converter efficiency falls below a desired level; elevating the catalytic converter temperature in response to said catalytic converter contamination signal; operating the engine in a rich condition for a first predetermined interval after said temperature elevation; and operating the engine in a lean condition for a second predetermined interval following said first predetermined interval.

By attempting to decontaminate the catalytic converter in response to degraded performance, it is possible to restore the operation of the catalytic converter if sulfur contamination was the problem. Thus, the contamination and poor performance of the catalytic converter can be remedied.

An advantage of the above aspect of the invention is that operating the engine at an elevated temperature and in a rich condition can remove sulfur contamination on the catalytic converter and increase catalytic converter performance.

Another advantage of the above aspect of the invention is that operating the engine at an elevated temperature and in a lean condition after operating at an elevated temperature and in a rich condition can further remove sulfur contamination on the catalytic converter and further increase catalytic converter performance.

Yet another advantage of the above aspect of the invention is if sulfur contamination was the cause of catalytic converter degradation, both the cost and inconvenience of a replacement system may be avoided.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein:

FIG. 5 is a high level flowchart of various operations performed by a portion of the embodiment shown in FIG. 1;

FIG. 6 is a high level flowchart of various operations performed by a portion of the embodiment shown in FIG. 1; and FIG. 7 is a high level flowchart of various operations performed by a portion of the embodiment shown in FIG. 1.

DESCRIPTION OF AN EMBODIMENT

Figure 1:
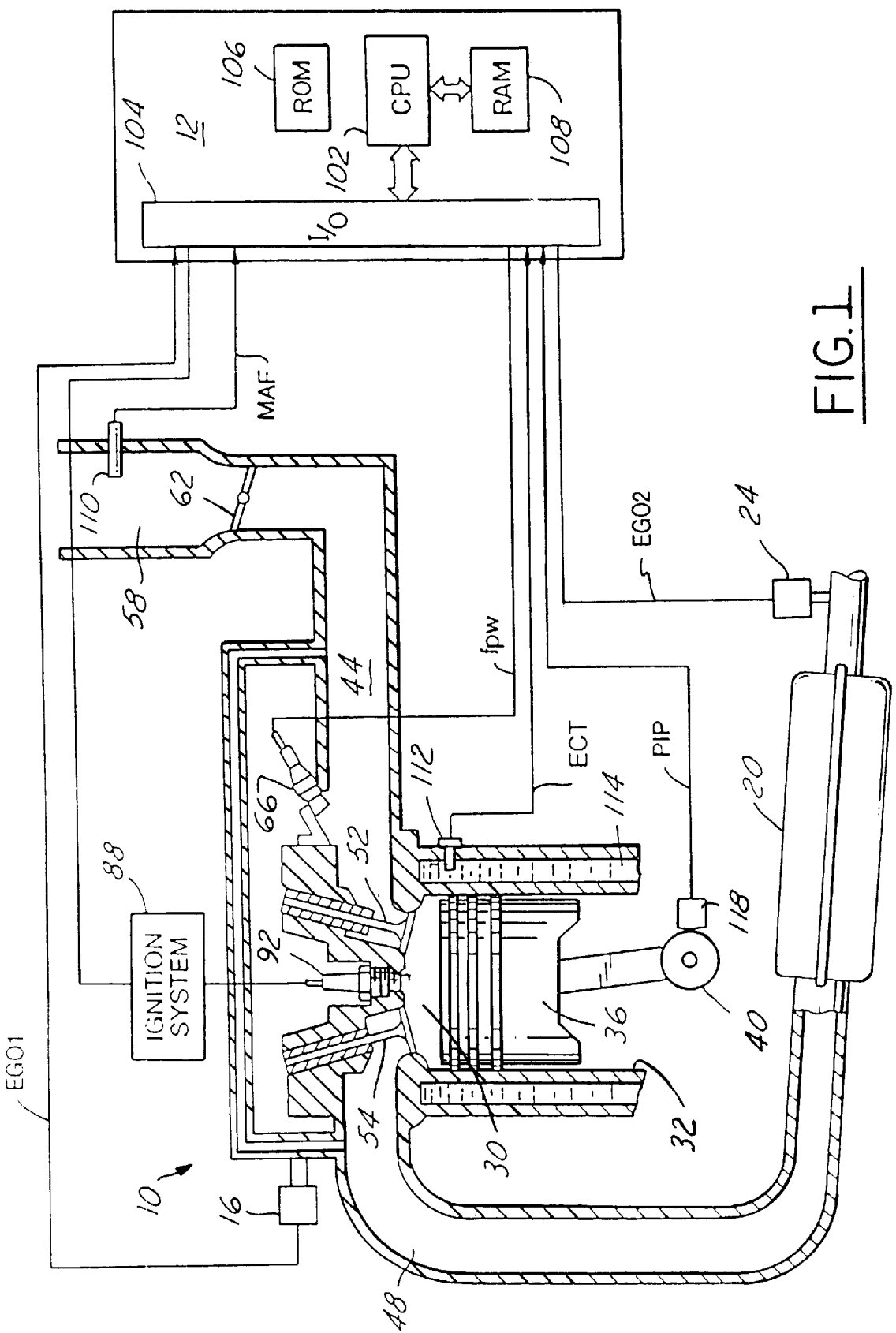
FIG. 1 is a block diagram of an engine in which the invention is used to advantage.

Internal combustion engine 10 comprising a plurality of cylinders, one cylinder of which is shown in FIG. 1, is controlled by electronic engine controller 12. In general terms which are described later herein, controller 12 controls engine air/fuel ratio in response to feedback variable FV derived from two-state exhaust gas oxygen sensor 16.

Continuing with FIG. 1, engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is shown communicating with throttle body 58 via throttle plate 62. Intake manifold 44 is also shown having fuel injector 66 coupled thereto for delivering liquid fuel in proportion to the pulse width of signal FPW from controller 12. Fuel is delivered to fuel injector 66 by a conventional fuel system (not shown) including a fuel tank, fuel pump, and fuel rail (not shown).

Conventional distributorless ignition system 88 provides ignition spark to combustion chamber 30 via spark plug 92 in response to controller 12. Two-state exhaust gas oxygen sensor 16 is shown coupled to exhaust manifold 48 upstream of catalytic converter 20. Two-state exhaust gas oxygen sensor 24 is shown coupled to exhaust manifold 48 downstream of catalytic converter 20. Sensor 16 provides signal EGO1 to controller 12 which converts signal EGO1 into two-state signal EGOS1. A high voltage state of signal EGOS1 indicates exhaust gases are rich of a reference air/fuel ratio and a low voltage state of converted signal EGO1 indicates exhaust gases are lean of the reference air/fuel ratio. Sensor 24 provides signal EGO2 to controller 12 which converts signal EGO2 into two-state signal EGOS2. A high voltage state of signal EGOS2 indicates exhaust gases are rich of a reference air/fuel ratio and a low voltage state of converted signal EGO1 indicates exhaust gases are lean of the reference air/fuel ratio.

Controller 12 is shown in FIG. 1 as a conventional microcomputer including: microprocessor unit 102, input/output ports 104, read only memory 106, random access memory 108, and a conventional data bus. Controller 12 is shown receiving various signals from sensors coupled to engine 10, in addition to those signals previously discussed, including: measurements of inducted mass air flow (MAF) from mass air flow sensor 110 coupled to throttle body 58; engine coolant temperature (ECT) from temperature sensor 112 coupled to cooling sleeve 114; a measurement of manifold pressure (MAP) from manifold pressure sensor 116 coupled to intake manifold 44; and a profile ignition pickup signal (PIP) from Hall effect sensor 118 coupled to crankshaft 40.

Figure 2:
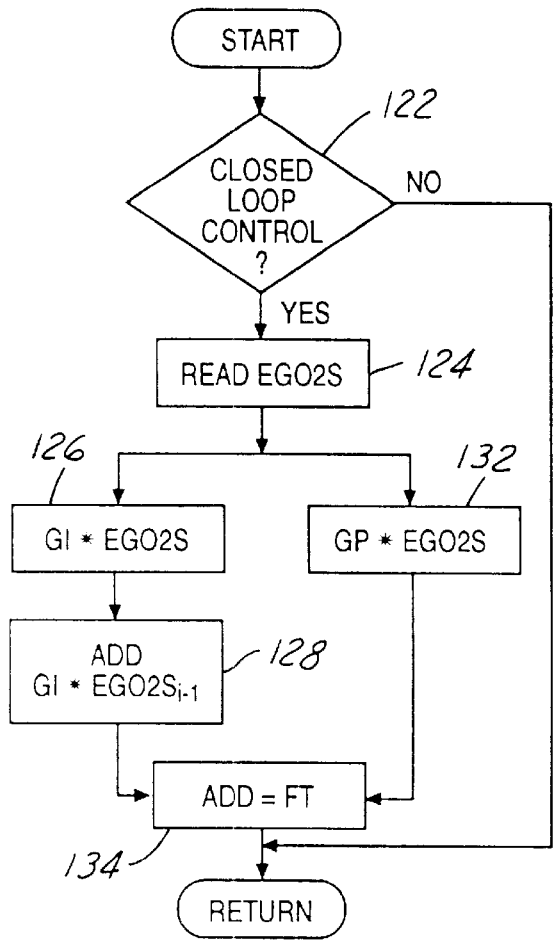
FIG. 2 is a high level flowchart of various operations performed by a portion of the embodiment shown in FIG. 1.

Referring now to FIG. 2, a flowchart of a routine performed by controller 12 to generate fuel trim signal FT is now described. A determination is first made whether closed-loop air/fuel control is to be commenced (step 122) by monitoring engine operation conditions such as temperature. When closed-loop control commences, signal EGO2S is read from comparator 54 (step 124) and subsequently processed in a proportional plus integral controller as described below.

Referring first to step 126, signal EGO2S is multiplied by gain constant GI and the resulting product added to products previously accumulated (GI*EGO2S$_{i-1}$) in step 128. Stated another way, signal EGO2S is integrated each sample period (i) in steps determined by gain constant GI. During step 132, signal EGO2S is also multiplied by proportional gain GP. The integral value from step 128 is added to the proportional value from step 132 during addition step 134 to generate fuel trim signal FT.

Figure 3:
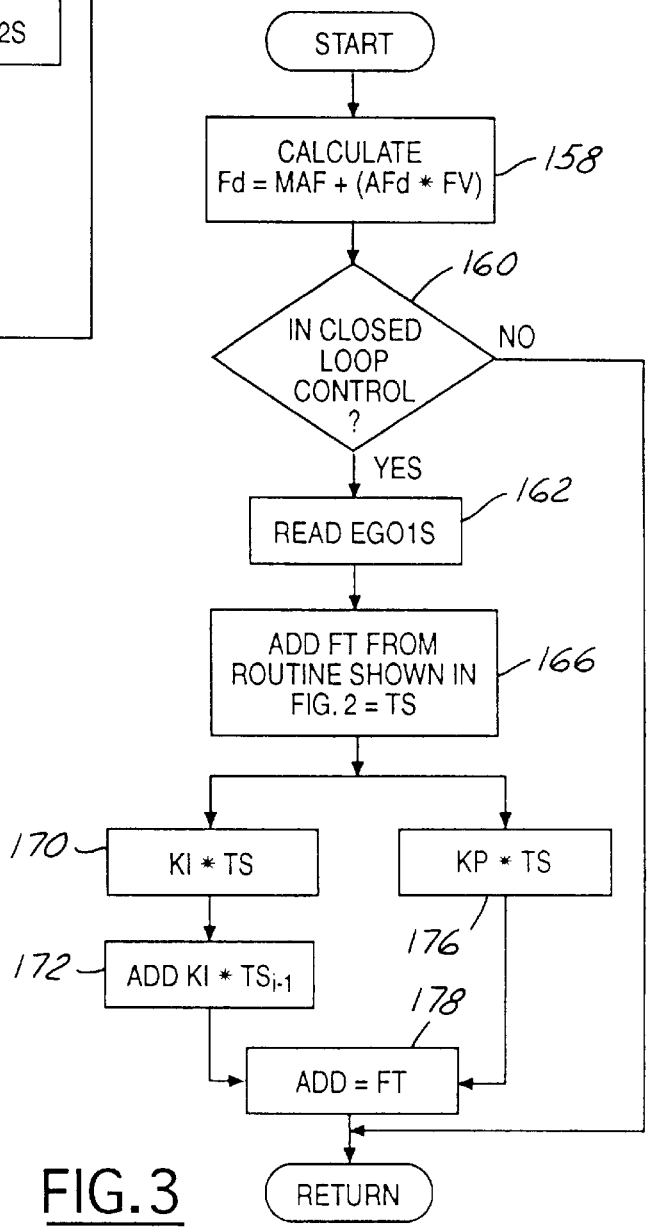
FIG. 3 is a high level flowchart of various operations performed by a portion of the embodiment shown in FIG. 1.

The routine executed by controller 12 to generate the desired quantity of liquid fuel delivered to engine 28 and trimming this desired fuel quantity by a feedback variable related both to sensor 44 and fuel trim signal FT is now described with reference to FIG. 3. During step 158, an open-loop fuel quantity is first determined by dividing measurement of inducted mass airflow (MAF) by desired air/fuel ratio AFd which is typically the stoichiometric value for gasoline combustion. However, setting AFd to a rich value will result in operating the engine in a rich state. Similarly, setting AFd to a lean value will result in operating the engine in a lean state. This open-loop fuel quantity is then adjusted, in this example divided, by feedback variable FV.

After determination that closed-loop control is desired (step 160) by monitoring engine operating conditions such as temperature (ECT), signal EGO1S is read during step 162. During step 166, fuel trim signal FT is transferred from the routine previously described with reference to FIG. 2 and added to signal EGO1S to generate trim signal TS.

During steps 170–178, a conventional proportional plus integral feedback routine is executed with trimmed signal TS as the input. Trim signal TS is first multiplied by integral gain value KI (step 170), and the resulting product added to the previously accumulated products (step 172). That is, trim signal TS is integrated in steps determined by gain constant KI each sample period (i) during step 172. A product of proportional gain KP times trimmed signal TS (step 176) is then added to the integration of KI*TS during step 178 to generate feedback variable FV.

Figure 4A:
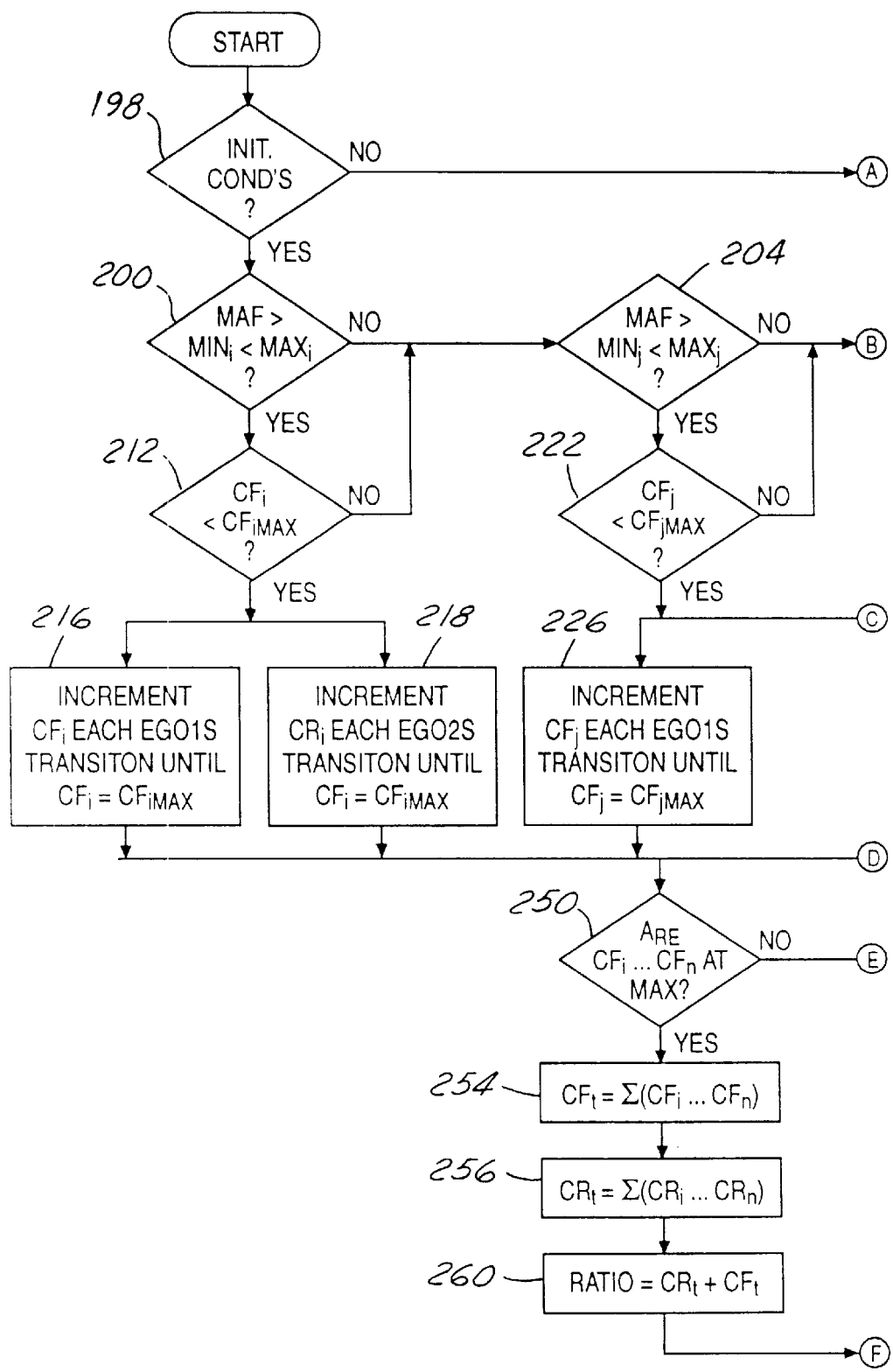
FIG. 4 is a high level flowchart of various operations performed by a portion of the embodiment shown in FIG. 1.
Figure 4B:
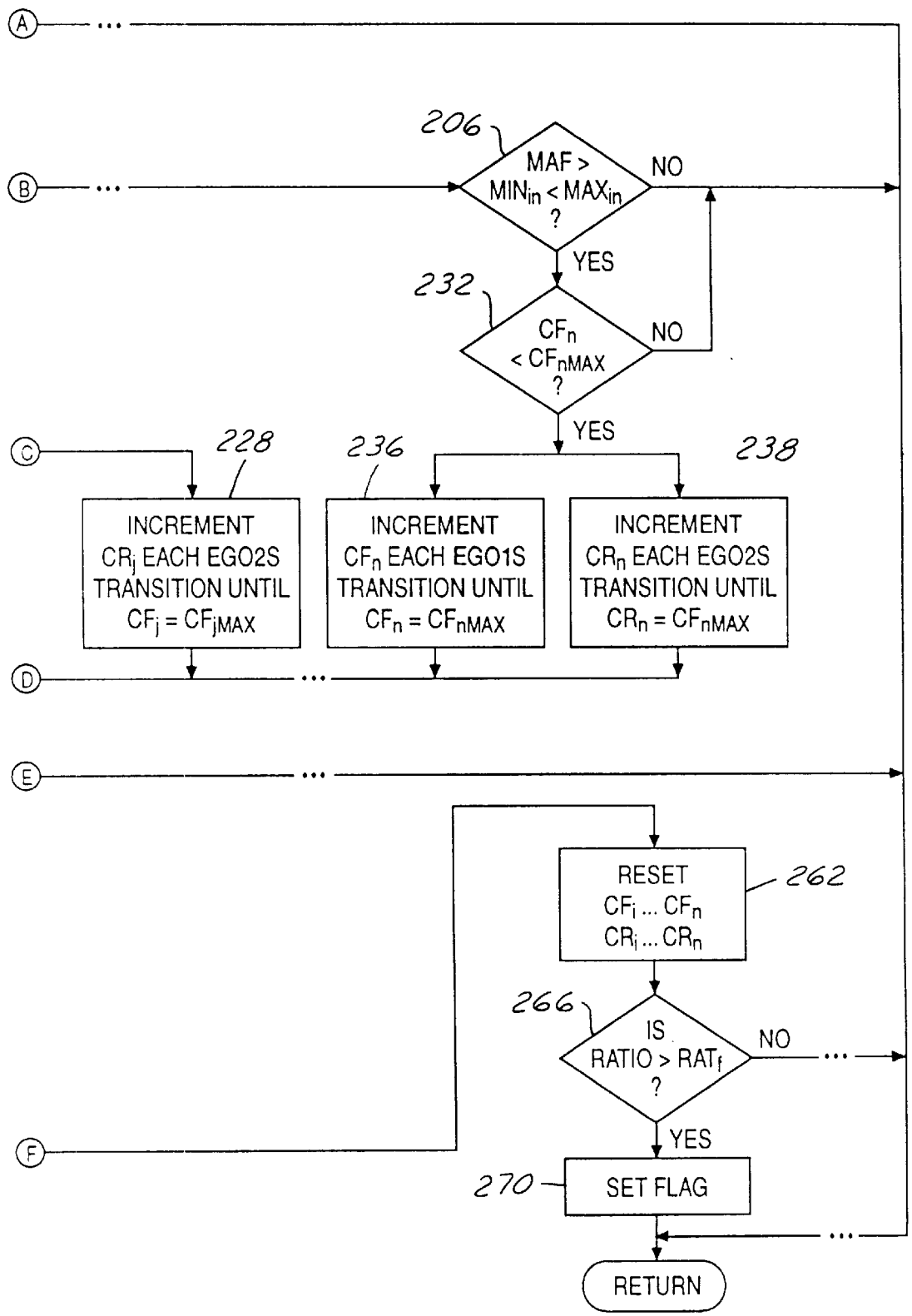

An example of testing converter efficiency is now described with particular reference to the flowchart shown in FIG. 4. During step 198, initial engine conditions are checked before entering the test cycle described below. More specifically, engine temperature (ECT) should be within a predetermine range, a predetermined time should have elapsed since the engine was started, and the closed-loop air/fuel control should have been operable for preselected time.

During steps 200, 204, and 206, the inducted airflow range in which engine 28 operating is determined. These ranges are described as range (i), range (j) . . . , range (n) for this example wherein "n" inducted airflow ranges are used to advantage.

Assuming engine operation is within airflow range (i), transitions between states of signal EGO1S are counted to generate count signal $CF_i$. This count is compared to maximum count $CF_{max}$ during step 212. While engine operation remains within airflow range (i), a test period of predetermined duration is generated by incrementing count $CF_i$ each transition of signal EGO1S until count $CF_i$ is equal to maximum count $CF_{max}$ (step 216). During this test period (i), count $CR_i$ is incremented each transition of signal EGO2S (step 218). Stated another way, count $CR_i$ is incremented each transition of signal EGO2S until count $CF_i = CF_{max}$.

When engine operation is within airflow range (j) as shown in step 204, predetermined period (j), count $CF_j$, and count $CR_j$ are determined in steps 222, 226, and 228 in a manner similar to that described above for airflow range (i) with respect to steps 212, 216, and 218. Each transition in signal EGO1S, count $CF_j$ is incremented until it reaches maximum count $CF_{jmax}$ (step 222). Predetermined test period (j) is thereby defined. During test period (j), count $CR_j$ is increment each transition of signal EGO2S (step 228).

The above described operation occurs for each airflow range. For example, when engine 28 is operating within airflow range (n) as shown in step 206, test period (n), count $CF_n$, and count $CR_n$ are generated as shown in steps 232, 236, and 238.

During step 250, a determination is made as to whether engine 28 has operated in all airflow ranges (i . . . n) for the respective test periods (i . . . n). Stated another way, step 250 determines when each count of transitions in signal EGO1S ($CF_i$, $CF_j$, . . . $CF_n$) have reached their respective maximum values ($CF_{imax}$, $CF_{jmax}$, . . . $CF_{nmax}$).

Each count ($CF_i$ . . . $CF_n$) of transitions in signal EGO1S for respective test periods (i . . . n) are summed in step 254 to generate total count $CF_t$. For reasons described above, the same total count $CF_t$ may be obtained by summing each maximum count ($CF_{imax}$ . . . $CF_{nmax}$) for respective test periods (i . . . n).

Total count $CR_t$ is generated in step 256 by summing each count ($CR_i$ . . . $CR_n$) for respective test periods (i . . . n). A ratio of total count $CR_t$ to total count $CF_t$ is then calculated during step 260 and all counts subsequently reset in step 262. If the calculated ratio is greater than a preselected reference ratio ($RAT_f$) a flag is set (steps 266 and 270) indicating that converter efficiency has degraded below a preselected limit.

The actual ratio calculated in step 266 may also be used to provide a measurement of converter efficiency.

The routine executed by controller 12 to manage decontamination of catalytic converter 20 is now described with reference to FIG. 5. During step 302, flag1 is set to a false state. During step 304, a call is made to invoke catalytic converter monitor described herein with reference to FIGS. 2–4. If flag is set indicating that converter efficiency has degraded below a preselected limit (step 306), then if flag1 is in a true state (step 308), a malfunction indicator is activated (step 310). During step 306, if flag is not set indicating that converter efficiency has not degraded below a preselected limit, then the routine returns to step 302. During step 308, if flag1 is not in a true state, then the routine invokes a sulfur removal procedure (step 314), described later herein with particular reference to FIGS. 6 and 7. During step 316, flag1 is set to a true state.

The routine executed by controller 12 to control on-board sulfur removal is now described with reference to FIGS. 6 and 7. Beginning with FIG. 6, during step 400, controller 12 sets a desired catalytic converter temperature of catalytic converter 20 temperature to a predetermined temperature, wherein the temperature control is described later herein with particular reference to FIG. 7. Controller 12 can raise catalytic converter temperature by creating an exothermic reaction, by for example, inducing engine misfire, operating the engine in a lean state, or modulating the engine air/fuel ratio and thus using oxygen storage capabilities of catalytic converter 20. Alternatively, controller 12 can raise catalytic converter temperature by adjusting engine operating parameters such as by retarding ignition timing to increase the temperature of the exhaust gas entering the catalytic converter 20. Similarly, controller 12 can raise catalytic converter temperature by varying the length of exhaust manifold 48, thereby decreasing lost heat and increasing the temperature of exhaust gasses entering catalytic converter 20. Varying the length of exhaust can be accomplished by, for example, having two exhaust passages (not shown) of different length and a valve (not shown) to direct exhaust flow from one passage to the other. Controller 12 can also raise catalytic converter temperature by controlling an electric heater (not shown) coupled to catalytic converter 20. For example, controller 12 can increase current of the electric heater (not shown) in response to a measured catalytic converter temperature. Furthermore, controller 12 can raise catalytic converter temperature by igniting exhaust gas. For example, additional fuel and air may be added to the exhaust stream creating a combustible mixture. This can be accomplished by, for example, adding a fuel injector (not shown) and air pump (not shown) in the exhaust system. Moreover, controller 12 can decrease catalytic converter temperature by reversing any of the processes described above herein.

Continuing with FIG. 6, the routine executed by controller 12 then operates the engine in a rich state (step 402). Controller 12 can operate the engine in a rich state for a first predetermined interval by, for example, adjusting the desired air fuel ratio AFd as previously described herein with particular reference to FIG. 3. During step 404, the routine then operates the engine in a lean state. Controller 12 can operate the engine in a lean state for a predetermined interval by, for example, adjusting the desired air fuel ratio AFd and injecting insufficient fuel for complete combustion, activating an air pump to add air to the exhaust, or deactivating injectors to any and or all injectors while the engine is operating, or any other method known to those skilled in the art and suggested by this disclosure.

The routine executed by controller 12 to control catalytic converter temperature is now described with reference to FIG. 7. During step 500, when catalytic converter temperature is below the desired catalytic converter temperature, controller 12 takes action to increase catalytic converter temperature (step 502) as described above herein. When catalytic converter temperature is above the desired catalytic converter temperature, controller 12 takes action to decrease catalytic converter temperature (step 504) as described above herein. When the engine is operating at a stoichiometric state, the preferred method for increasing catalytic converter temperature to the desired catalytic converter temperature is through ignition timing. When the engine is operating in a rich or lean state, the preferred method for maintaining catalytic converter temperature at the desired catalytic converter temperature is also through control of ignition timing. However, when operating in a lean state, less ignition timing retard is necessary due to the effect of the lean air/fuel ratio.

This concludes the description of the Preferred Embodiment. The reading of it by those skilled in the art would bring to mind many alterations and modifications without departing from the spirit and scope of the invention. For example, many different types catalytic converter monitors can be used. Also, there are innumerable ways to provide rich and lean engine operation and to control exhaust gas temperature. Accordingly, it is intended that the scope of the invention be limited by the following claims.

We claim:

1. A catalytic converter decontamination method for an internal combustion engine, the method comprising the steps of:

generating a catalytic converter contamination signal when catalytic converter efficiency falls below a desired level;

elevating a catalytic converter temperature in response to said catalytic converter contamination signal;

in response to said elevated temperature, initiating a decontamination period for removing sulfur, said decontamination period comprising:

a first interval where the engine operates in a rich condition; and a second interval where the engine operates in a lean condition after said first interval; and operating the engine rich during said first interval and operating the engine lean during said second interval to remove sulfur from said catalytic converter.

2. The method recited in claim 1 wherein said generating step further comprises the steps of:

measuring a number of transitions from a first state to a second state of an exhaust gas oxygen sensor positioned upstream of the catalytic converter; and indicating catalytic converter efficiency by calculating a ratio between said transitions in said upstream exhaust gas oxygen sensor to transitions in a downstream exhaust gas oxygen sensor position downstream of the catalytic converter.

3. The method recited in claim 1 wherein said elevating step further comprises the step of increasing said catalytic converter temperature by creating an exothermic reaction.

4. The method recited in claim 1 wherein said elevating step further comprises the step of increasing said catalytic converter temperature by adjusting engine operating parameters.

5. The method recited in claim 4 wherein said increasing step further comprises the step of retarding an ignition timing.

6. The method recited in claim 1 wherein said elevating step further comprises the step of increasing said catalytic converter temperature by varying a length of an exhaust manifold.

7. The method recited in claim 1 wherein said elevating step further comprises the step of increasing said catalytic converter temperature by controlling an electric heater coupled to said catalytic converter.

8. A catalytic converter decontamination method for an internal combustion engine, the method comprising the steps of:

measuring catalytic converter efficiency;

generating a catalytic converter contamination signal when measured catalytic converter efficiency falls below a preselected value;

elevating the catalytic converter temperature to at least a predetermined temperature in response to a catalytic converter contamination signal;

in response to said elevated temperature, initiating a decontamination period for removing sulfur, said decontamination period comprising:

a first interval where the engine operates in a rich condition; and a second interval where the engine operates in a lean condition after said first interval;

operating the engine rich during said first interval and operating the engine lean during said second interval while maintaining the catalytic converter temperature above said predetermined temperature to remove sulfur from said catalytic converter;

re-measuring catalytic converter efficiency; and activating a malfunction indicator when the re-measured catalytic converter efficiency is below a desired value.

9. The method recited in claim 8 wherein said predetermined temperature is 1250° F.

10. The method recited in claim 8 wherein said measuring catalyst efficiency step further comprises the steps of:

measuring a number of transitions from a first state to a second state of an exhaust gas oxygen sensor positioned upstream of the catalytic converter; and indicating catalytic converter efficiency by calculating a ratio between said transitions in said upstream exhaust gas oxygen sensor to transitions in a downstream exhaust gas oxygen sensor position downstream of the catalytic converter.

11. The method recited in claim 8 wherein said elevating step further comprises the step of increasing said catalytic converter temperature by creating an exothermic reaction.

12. The method recited in claim 8 wherein said elevating step further comprises the step of increasing said catalytic converter temperature by adjusting engine operating parameters.

13. The method recited in claim 12 wherein said increasing step further comprises the step of adjusting ignition timing.

14. The method recited in claim 8 wherein said elevating step further comprises the step of increasing said catalytic converter temperature by varying a length of an exhaust manifold.

15. The method recited in claim 8 wherein said elevating step further comprises the step of increasing said catalytic converter temperature by controlling an electric heater coupled to said catalytic converter.

16. An engine control system for controlling engine air/fuel ratio and concurrently decontaminating an exhaust catalytic converter comprising:

an internal combustion engine capable of fuel combustion at lean air/fuel ratios and at rich air/fuel ratios;

an exhaust conduit connected to the engine;

a catalytic converter connected to the exhaust conduit susceptible to contamination by an exhaust gas containing sulfur;

a first exhaust gas oxygen sensor positioned upstream of said exhaust catalytic converter;

a second exhaust gas oxygen sensor positioned downstream of said exhaust catalytic converter;

an efficiency monitor for measuring catalytic converter efficiency by measuring a first number of transitions from a first state to a second state of said first exhaust gas oxygen sensor, measuring a second number of transitions from a first state to a second state of said second exhaust gas oxygen sensor, and calculating a ratio between said first and second number of transitions; and a decontamination controller for elevating the catalytic converter temperature to at least a predetermined temperature in response to a catalytic converter efficiency signal;

in response to said elevated temperature, initiating a decontamination period for removing sulfur, said decontamination period comprising: a first interval where the engine operates in a rich condition; and a second interval where the engine operates in a lean condition after said first interval; operating the engine rich during said first interval and operating the engine lean during said second interval to remove sulfur from said catalytic converter; re-measuring catalytic converter efficiency; and activating a malfunction indicator in response to the re-measured catalytic converter efficiency.

17. The system recited in claim 16 wherein said decontamination controller further elevates the catalytic converter temperature to at least a predetermined temperature by adjusting ignition timing.

* * * * *